United States Patent
Sutton

[11] 3,723,617
[45] Mar. 27, 1973

[54] ANTI-INFLAMMATORY COMPOSITIONS CONTAINING ACYLATED-β-D-GLUCOPYRANOSIDES AND METHODS OF USING THEM

[75] Inventor: Blaine M. Sutton, Hatboro, Pa.

[73] Assignee: Smith Kline & French Laboratories, Philadelphia, Pa.

[22] Filed: Dec. 31, 1968

[21] Appl. No.: 789,000

[52] U.S. Cl. ........................... 424/180, 260/210 R
[51] Int. Cl. ........................................... A61k 27/00
[58] Field of Search .................... 424/180; 260/210 R

[56] References Cited

UNITED STATES PATENTS 3,538,077  11/1970  Rossi .................................. 424/180
3,542,761  11/1970  Rossi .................................. 424/180

*Primary Examiner*—Stanley J. Friedman
*Assistant Examiner*—Vincent D. Turner
*Attorney*—William H. Edgerton, Richard D. Foggio, Joan S. Keps, Alan D. Lourie and Joseph A. Marlino

[57] ABSTRACT

Pharmaceutical compositions containing dosage units of compounds of the structural formula:

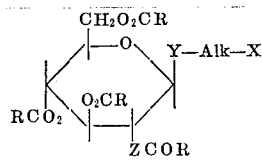

wherein X is halo, carbalkoxy to five carbons, acyloxy to five carbons, acylamido to five carbons, acylmercapto to five carbons, or aromatic hydrocarbons oxy to 10 carbons; Y is sulfur or oxygen; Z is —NH— or oxygen; R's are one of aryl to eight carbons; alkyl to five carbons; and Alk is straight or branched chain alkyl up to five carbons, which may be substituted by alkyl, acyloxy or acylamido, as limited in defining X above.

11 Claims, No Drawings

ANTI-INFLAMMATORY COMPOSITIONS CONTAINING ACYLATED-β-D-GLUCOPYRANOSIDES AND METHODS OF USING THEM

The preferred active ingredient of this invention, for example, are prepared by treating an 2-acylamido-2-deoxy-3,4,6-tri-O-acetyl-β-D-glucopyranoside halide with an appropriate sulfhydryl agent, such as N-acetylcysteinamine, to form the corresponding 1-substituted analog.

This invention relates to acylated glucopyranoside derivatives having useful pharmacodynamic activity. More specifically, the compounds of this invention have anti-arthritic activity as measured by their ability to inhibit adjuvant-induced polyarthritis in rats.

The novel compositions comprising substituted glucopyrano-sides of this invention are represented by the following structural formula:

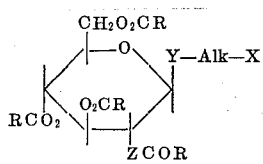

wherein:
X is halo, carbalkoxy to five carbons, benzoyloxy, acyloxy to five carbons, acylamido to five carbons, acylmercapto to five carbons, or aromatic hydrocarbons-oxy to 10 carbons, such as phenyloxy, phenethyloxy, benzyloxy or naphthyloxy;
Y is sulfur or oxygen, preferably sulfur;
Z is oxygen or —NH—, preferably —NH—;
R's are one of aryl to eight carbons, or alkyl to five carbons, preferably alkyl, and
Alk is straight or branched chain alkyl up to five carbons, preferably —CH₂—CH₂—, which may or may not be substituted by alkyl, acyloxy or acylamido, as limited above.

By the term acyl where used herein is intended the radical form from an alkanoic carboxylic acid.

It is preferred to use as the novel anti-inflammatory composition, the wholly novel compounds of the general structural Formula II below:

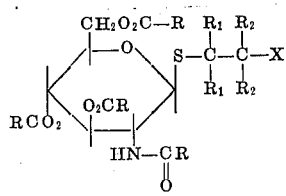

wherein:
X is halo, preferably bromo, acylamido to five carbons, or —CO₂R;
R is phenyl or alkyl to five carbons; and
R₁'s and R₂'s are hydrogen, lower alkyl, or acylamido to five carbons.

Advantageous and preferred compounds of this invention are:
3'(1-Thio-2-acetamido-2-deoxy-3,4,6-tri-O-acetyl-β-D-glycopyranosyl) propionic acid (SK&F D34,104)
2'-Bromoethyl 1-thio-2,3,4,6-tetra-O-acetyl-β-D-glucopyranoside (SK&F D34,809)
Methyl 2'-acetamido-3'-(1-thio-2-acetamido-2-deoxy-3,4,6-tri-O-acetyl-β-D-glucopyranosyl) propionate (SK&F D34,938)
Methyl 2'-acetamido-3'-methyl-3'-(1-thio-2-acetamido-2-deoxy-tri-O-acetyl-β-D-glucopyranosyl) butyrate (SK&F D35,724)
2'-Chloroethyl-2,3,4,6-tetra-O-acetyl-β-D-glucopyranoside
2'-Hydroxyethyl-1-thio-2,3,4,6-tetra-O-acetyl-β-D-glucopyranoside (SK&F D34,104)
2'-Hydroxyethyl-1-Thio-2,3,4,6-tetra-O-propionyl-β-D-glucopyranoside
2'-Hydroxyethyl-1-Thio-2,3,4,6-tetra-O-butyryl-β-D-glucopyranoside
Methyl 3-(1-thio-2,3,4,6-tetra-O-acetyl-β-D-glucopyranosyl) propionate (SK&F D34,266)
Methyl 3-(1-thio-2,3,4,6-tetra-O-propionyl-β-D-glucopyranosyl) propionate
Methyl 3-(1-thio-2,3,4,6-tetra-O-butyryl-β-D-glucopyranosyl) propionate
Methyl 3-(1-thio-2,3,4,6-tetra-O-acetyl-β-D-glucopyranosyl) butyrate
Methyl 3-(1-thio-2,3,4,6-tetra-O-acetyl-β-D-glucopyranosyl) valerate
2'-Acetoxyethyl-2-acetamido-2-deoxy-1-thio-β-D-3,4,6-tri-O-acetyl-β-D-glucopyranoside (SK&F D34276)
2'-propionoxyethyl 2-propionamido-2-deoxy-1-thio-3,4,6-tri-O-propionyl-β-D-glucopyranoside
2'-Butyroxyethyl 2-butyramido-2-deoxy-1-thio-3,4,6-tri-O-butyryl-β-D-glucopyranoside
3'-(1-Thio-2,3,4,6-tetra-O-acetyl-β-D-glucopyranosyl)propionic acid (SK&F D34438)
3'-(1-Thio-2,3,4,6-tetra-O-propionyl-β-D-glucopyranosyl)propionic acid
S-Propionyl-2'-mercaptoethyl 1-thio-2,3,4,6-tetra-O-propionyl-β-D-glucopyranoside
S-Acetyl-2'-mercaptoethyl 1-thio-2,3,4,6-tetra-O-acetyl-β-D-glucopyranoside (SK&F D35184)
S-Acetyl-2'-mercaptoethyl 2,3,4,6-tetra-O-acetyl-β-D-glucopyranoside (SK&F D-35226)
S-Propionyl-2'-mercaptoethyl 2,3,4,6-tetra-O-propionyl-β-D-glucopyranoside
S-Butyryl-2'-mercaptoethyl 2,3,4,6-tetra-O-butyl-β-D-glucopyranoside A standard pharmacological procedure (Freund's Adjuvant) Pearson et al., *Arth. & Rheum.* 2:440–59, 1959, slightly modified as described hereinafter, can be used to characterize such known anti-arthritic agents as phenylbutazone and aspirin. Exemplary of the activity shown by the compounds of this invention in this standard pharmacological procedure is the prevention (or amelioration) of poly-arthritis, previously induced in rats by injection of Freund's adjuvant into a paw.

Adjuvant arthritis is produced by a single intradermal injection of Freund's Adjuvant into a hindpaw (left) footpad. The injected leg becomes inflamed (increased volume) and reaches maximal size within 3–5 days (primary lesion). The animals exhibit a decrease in body weight gain during this initial period. The adjuvant-arthritis (secondary lesion) occurs after a delay of approximately 10 days, and is characterized by inflammation of the non-injected sites (right hind leg), decrease in body weight, and further increases in the volume of the injected hind leg. Test compounds are administered daily, beginning on the day of the adjuvant injection, for 18 days, exclusive of days 5, 6, 12 and 13. Drug activity on the primary (left leg-day 3) and secondary (both legs > day 10) lesions is determined by comparing leg volumes of the treated group with a control arthritic (vehicle) group. Body weight changes and subject grading score of the arthritic uninjected leg are also used as indicators of the arthritic syndrome. (Grading Score: 1=No involvement (absence of visible nodules, redness and/or edema) 1 = Slight, 2 = Moderate, 3 = Marked, and 4 = Severe). Hind leg volumes are measured by immersing the leg into a mercury reservoir and recording the subsequent mercury displacement utilizing equipment described in the complete protocol.

Definition of Significant Activity

A compound is considered to have antiarthritic activity if it produces a statistically significant ($p < 0.05$) decrease in the inflamed hind leg volumes and/or the arthritic scores of the treated groups when compared with controls. The level of significant difference between treated groups and control groups is determined by the student $t$ test. *Statistical Methods*, Snedecor, G. W. et al., 6th Edition, 1957, Iowa State U. Press. Representative examples of these test results are listed hereafter with pertinent effective doses at which no overt toxic effects were observed.

| Candidate Anti-Inflams. | Rat Effective Dose in mg/kg Primary Lesion (Left Leg) | (Right Leg) Secondary Lesion |
|---|---|---|
| Flufenamic Acid | 50 | 50 |
| Phenylbutazone | 50 | 50 |
| Aspirin | 200 | 200 |
| SK&F 34809* | 100 | 100 |
| SK&F 34938 | 100 | 100 |
| SK&F 35724 | 100 | 100 |
| SK&F 34104 | 100 | Neg |
| SK&F 34266 | 100 | Neg |
| SK&F 34276 | 100 | Neg |
| SK&F 34438 | 100 | Neg |
| SK&F 35184 | 100 | 100 |
| SK&F 35177 | 100 | 100 |
| SK&F 35226 | 100 | 100 |

*The chemical names of these SK&F compounds is given in the working examples or in the list of representative species.

The compounds of this invention (Formula I, when the R's are alkyl, X is acylamido, Y is sulfur and Z is —NH) are prepared by treating a 2-acylamido-2-deoxy-3,4,6-tri-O-acetyl-β-D-glucopyranosyl halide with an appropriate sulfhydryl agent to form the corresponding 1-substituted analog. For example, an N-acylated cysteinamine is combined with an acyl chloroglucosaminide, in the presence of sodium methoxide and methanol, and reacylated to form the corresponding 2'-acylamidoethyl-1-thio-2-acylamido-2-deoxy-3,4,6-tri-O-acyl-β-D-glucopyranoside.

Compounds of Formula I (wherein the R's are alkyl, X is halo, is sulfur, and Z is oxygen) are prepared starting with a 1-thio-2,3,4,6-tetra-O-acyl-β-D-glucopyranose, treating the same with an appropriate dihaloalkane in an alkaline media, which forms the corresponding analogue. For example, treating 1-thio-2,3,4,6-tetra-O-acetyl-β-D-glucopyranose with 1,2-dibromoethane, in a basified water-acetone medium forms the corresponding 2-bromoethyl-1-thio-2,3,4,6-tetra-O-acetyl-β-D glucopyranoside. This same derivative can be prepared by treating a 2-(2,3,4,6-tetra-O-acetyl-β-D-glucopyranosyl)-2-thiopseudourea hydrobromide with 1,2-dibromoethane in a similar reaction medium.

Compounds of Formula I (wherein the R's are alkyl, X is acyloxy, Y is sulfur, Z is oxygen) are prepared starting with 2 2,3,4,6-tetra-O-acyl-β-D-glucopyranosyl halide, treating same with a mercaptoalkanol and acylating to yield an acyloxyalkyl 1-thio-2,3,4,6-tetra-O-acetyl-β-D-glucopyranoside. For example, treating the reaction product from 1-bromo-2,3,4,6-tetra-O-acetyl-β-D-glucopyranosyl bromide (acetobromoglucose) and 2-mercaptoethanol with acetic anhydride in pyridine yields 2'-acetoxyethyl 1-thio-2,3,4,6-tetra-O-acetyl-β-D-glucopyranoside.

Compounds of Formula I (wherein the R's are aryl, X is aryloxy, Y is sulfur and Z is oxygen) are prepared by deacylating the tetraacyl products of the immediately preceding paragraph, and treating with benzoyl halides to give the corresponding tetra-O-benzoyl-β-D-glucopyranosides.

Compounds of Formula II (wherein at least one of the R's are acylamido, X is $CO_2R$, and Z is NH—) are prepared starting with a 2-acetamido-2-deoxy-3,4,6-tri-O-acetyl-β-D-glucopyranosyl halide, treating with an N-acylamido-alkylcysteinate to give the corresponding 2'-acylamido-3'-(1-thio-2-acetamido-2-deoxy-3,4,6-tri-O-acetyl-β-D-pyranosyl propionate. For example, acetochloroglucosaminide is treated with methyl-N-acetyl cysteinate to yield methyl-2'-acetamido-3'-(1-thio-2-acetamido-2-deoxy-3,4,6-tri-O-acetyl-β-D-glucopyranoside)propionate [SK&F D-34938].

Similarly, the same 1-halo-2-acetamido starting materials, exemplified by acetochloroglucosaminide, are treated with an alkyl N-acylamido-3-thio alkanoate to yield compounds of Formula II wherein the R's are alkyl and acylamido, X is $CO_2R$, and Z is —NH—. For example, by treating the aminide with methyl 2-acetamido-3-methyl-3-thiobutyrate, there is obtained methyl 2'-acetamido-3'-methyl-3'-(1-thio-2-acetamido-2-deoxy-3,4,6-tri-O-acetyl-β-D-glucopyrano-syl) butyrate. [SK&F D-35724].

EXAMPLE 1

Preparation of 2'-Acetamidoethyl 1-Thio-2-acetamido-2-deoxy-3,4,6-tri-O-acetyl-β-D-glucopyranoside [SK&F D-35177]

To a solution of 0.902 g. of sodium in 150 ml. methanol at 0° is added 4.76 g. (0.04 mole) of N-acetylcysteinamine and 14.64 g. (0.04 mole) of acetochloroglucosaminide. The mixture was stirred at 0° until solution was achieved and then allowed to stand at room temperature for one hour. Acetic acid is added to destroy any unreacted sodium methoxide, methanol is removed in vacuo and the residue is suspended in 100 ml. pyridine. An excess (60 ml.) of acetic anhydride is added all at once to the suspension and the mixture stirred overnight. The resultant solution is dissolved in chloroform and washed successively with 10 percent hydrochloric acid, water, 10 percent sodium bicarbonate, dried over anhydrous sodium sulfate, filtered and the filtrate evaporated. The resultant oil is chromatographed on 500 g. silica gel using a gradient of chloroform-acetone as eluant. Final elution is with pure acetone. Final recrystallization is from acetone (250 ml.)-hexane (400 ml.), 2.0 g., m.p. 216°–226.5° (uncorr.) $[\alpha]_D^{25}$ −35.9° [c.1.108 (CHCl$_3$)]. N-acetylcysteinamine-Chem. Abs. 48, p. 12792b.

EXAMPLE 2

Preparation of 2-Bromoethyl 1-Thio-2,3,4,6-tetra-O-acetyl-β-D-glucopyranoside [SK&F D-34809)]

A suspension of 19.48 g. (0.04 mole) of 2-(2,3,4,6-tetra-O-acetyl-β-D-glucopyranosyl)-2-thiopseudourea hydrobromide and 11.12 g. (0.08 M.) potassium carbonate in a mixture of 200 ml. water, 70 ml. (0.7 mole) 1,2-dibromoethane and 200 ml. water, 70 ml. (0.7 mole) 1,2-dibromoethane and 200 ml. of acetone is stirred for one hour at room temperature. The organic phase is separated with the aid of chloroform and evaporated in vacuo. The resulting residue is chromatographed through 500 g. silica gel using 5 percent methanol in chloroform as eluant. The material obtained ($R_f$ 0.56, silica gel, 5 percent methanol in chloroform) is recrystallized from a mixture of 300 ml. No. 30 alcohol and 250 ml. water to give 10.1 g., m.p. 110°–111°(Uncorr.) $[\alpha]_D^{25}$ −32.6° [c. 0.892 (CHCl$_3$)]. 2-(2,3,4,6-Tetra-O-acetyl-β -D-glucopyranosyl)-2-thiopseudourea hydrobromide. Methods in Carbohydrate Chemistry II, p. 435.

EXAMPLE 3

Preparation of 2'-Acetoxyethyl 1-Thio-2,3,4,6-tetra-O-acetyl-β-D-glucopyranoside (SK&F D-34104)

To a solution of 0.46 g. (0.022 at. wt.) of sodium in 100 ml. methanol at 0° is added 7.12 g. (0.04 mole) of 2-mercaptoethanol and 8.22 g. (0.20 mole) of acetobromoglucose. The mixture is stirred at 0° for 5 minutes and allowed to stand at room temperature of 1 hour. Acetic acid is added to destroy any unreacted sodium methoxide, methanol evaporated in vacuo and the residue suspended in 100 ml. pyridine. An excess of acetic anhydride (30 ml.) is added all at once and the reaction mixture stirred overnight. The resultant solution is dissolved in chloroform and washed successively with 10 percent hydrochloric acid, water, 10 percent sodium bicarbonate, is dried over sodium sulfate, filtered and evaporated. Recrystallization of the residue from isopropanol gave 5.3 g. of white crystals, m.p. 108.5°–109.5° (uncorr.) $[\alpha]_D^{25}$ −28.20° [(CHCl$_3$)] Acetobromoglucose *Methods in Carbohydrate Chemistry* II p. 371.

EXAMPLE 4

Preparation of 2'-Benzoyloxyethyl 1-Thio-2,3,4,6-tetra-O-benzoyl β-D-glucopyranoside To a solution of 9.0 g. (0.02 mole) of 2'-acetoxyethyl 1-thio-2,3,4,6tetra-O-acetyl-β-D-glucopyranoside in 500 ml. methanol at room temperature is added 0.1 g. of sodium. After one hour, the solution is reacted with carbon dioxide and the methanol evaporated. The gummy residue is suspended, in 100 ml. of pyridine at 0° and 40 ml. of benzoyl chloride is added thereto over a one hour period. After an additional hour at 0°, the mixture is stirred for 24 hours at room temperature. The excess benzoyl chloride is decomposed with water and the solution dissolved in chloroform. The chloroform solution is washed successively with 10 percent hydrochloric acid, water, 10 percent sodium bicarbonate and evaporated. The residual oil solidified on treatment with isopropanol. Recrystallization from absolute ethanol gave 4.3 g. of white crystals, m.p. 129°–130° (uncorr.) $[\alpha]_D^{25}$ + 15.3° [c. 1.102 (CHCl$_3$)].

EXAMPLE 5

Preparation of Methyl 2'-Acetamido-3'-(1-thio-2-acetamido-2-deoxy-3,4,6-tri-O-acetyl-β-D-glucopyranosyl) propionate (SK&F D34938)

To a solution of 0.46 g. (0.022 at wt.) of sodium in 100 ml. of methanol at 0° is added 4.66 g. (0.02 mole) of Methyl-N-acetyl cysteinate[1] ([1]Methyl-N-acetyl cysteinate *Chem. Abs.* 43, 50 1592i (1956)) and 7.30 g. (0.02 mole) of acetochloroglucosaminide[2] ([2]Acetochloroglucosaminide *J. Org. Chem.*, 27, p. 1794 (1962)). The mixture is stirred at 0° until solution is achieved and then allowed to stand at room temperature for one hour. Acetic acid is added to destroy any unreacted sodium methylate, methanol is evaporate in vacuo and the residue suspended in 100 ml. of pyridine. An excess of aceticanhydride (30 ml.) is added all at once and the reaction mixture stirred overnight.

The resultant solution is dissolved in chloroform and washed successively with 10 percent hydrochloric acid, water, 10 percent sodium bicarbonate and dried. Evaporation gave a solid which is recrystallized from chloroform-ether, 2.0 g., m.p. 207°–8° (uncorr.) $[\alpha]_D^{25}$−43.8° [c. 1.1 (CHCl$_3$)].

EXAMPLE 6

Preparation of Methyl 2'-Acetamido-3'-Methyl-3'-(1-thio-2-acetamido-2-deoxy 3,4,6-tri-O-acetyl-β-D-glucopyranosyl) butyrate (SK&F D-35724)

To a solution of 0.46 g. (0.022 at wt.) of sodium in 100 ml. of methanol at 0° was added 5.22 g. (0.02 mole) of methyl 2-acetamido-3-methyl-3-thiobutyrate[1] ([1]Methyl-2cf-acetamido-3-methyl-thiobutyrate *Chem. Abs.* 43, 8892f (1949) 50 1592i (1956)), and 7.30 g. (0.02 mole) of acetochloroglucosaminide. The mixture is first stirred at 0° until solution, and then at room temperature for 1 hour. Acetic acid is added to destroy unreacted sodium methoxide, methanol is removed in vacuo and the residue suspended in 100 ml. pyridine. An excess (30 ml.) of acetic anhydride is added all at once and the mixture stirred overnight. The resultant solution is dissolved in chloroform and is washed successively with 10 percent hydrochloric acid, water, 10 percent sodium bicarbonate and evaporated. The oil obtained is chromatographed through 250 g. silica gel with 3 percent methanol in chloroform. The material ($R_f$ 0.20, silica gel, 5 percent chloroform in methanol) is recrystallized from ether to give 1.5 g. of white crystals, m.p. 80°–90° (uncorr.) $[\alpha]_D^{25}$−10.1° c.0739 (CHCl$_3$).

The compounds of this invention may be administered orally or parenterally in conventional dosage unit forms by incorporating the appropriate dose with carriers according to accepted practice.

The pharmaceutical carrier employed may be, for example, either a solid or liquid. Exemplary of solid carriers are lactose, terra alba, sucrose, talc, gelatin, agar, pectin, acacia, magnesium stearate, stearic acid and the like. Exemplary of liquid carriers are syrup, peanut oil, olive oil, water and the like. Similarly the carrier or diluent include any time delay material well known to the art, such as glyceryl monostearate or glyceryl distearate along or with a wax.

A wide variety of pharmaceutical forms can be employed. Thus, if a solid carrier is used the preparation can be tableted, placed in a hard gelatin capsule in powder or pellet form or in the form of a troche or lozenge. The amount of solid carrier will vary widely but preferably will be from about 25 mg. to about 1 g. If a liquid carrier is used, the preparation will be in the form of a syrup, emulsion, soft gelatin capsule, ampul or liquid suspension.

The active medicament preferably will be, typically per dosage unit, in an amount of from about 5 mg. to about 1000 mg., and advantageously from about 100 mg. to about 500 mg.

Advantageously equal doses will be administered two to twelve times daily. Preferably, the daily dosage regimen will be from 0.05 g. to about 12 g., and most advantageously from about 0.2 g. to about 6.0 g. of active medicament in pharmaceutical forms. At the higher daily dosage, two or more capsules or tablets may be taken at each administration to attain the intended dosage level. When the administration described above is carried out, anti-arthritic activity is effectively achieved.

In certain veterinary practices, the preparations can also be given per se, or as an additive to the feed or drinking matter of animals.

These preparations are made following the conventional techniques of the pharmaceutical chemist involving variously mixing and dissolving the ingredients as appropriate to the desired end product.

What is claimed is:

1. A pharmaceutical composition having anti-arthritic activity, in dosage unit form, comprising a pharmaceutical carrier and an effective amount of from about 5 mg. to about 1000 mg. of an antiarthritic agent of the formula:

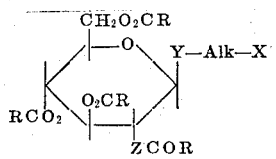

wherein:
  X is bromo, chloro, carbalkoxy of from two to five carbons, acyloxy of from two to five carbons, acylamido of from two to five carbons, acylmercapto of from two to five carbons, or benzoyloxy;
  Y is sulfur or oxygen;
  Z is —NH— or oxygen;
  R's are one of phenyl or alkyl of from one to five carbons; and
  Alk is straight or branched chain alkyl of from two to five carbons, which may be substituted by acylamido of from two to five carbons.

2. The composition of claim 1 wherein X is bromo, chloro, acylamido of from two to five carbons or —$CO_2R$, Y is sulfur, Z is —NH—, R is phenyl or alkyl of from one to five carbons, and Alk is

further wherein the $R_1$ and $R_2$ are hydrogen, alkyl of from one to five carbons, or acylamido of from two to five carbons.

3. The composition of claim 1 wherein X is bromo or chloro, Y is sulfur, Z is oxygen, the R's are methyl, and Alk is —$CH_2$—$CH_2$-.

4. The composition of claim 1 wherein X is

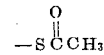

Y is sulfur, Z is O, and the R's are methyl.

5. The composition of claim 1 wherein X is

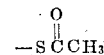

Y and Z are oxygen and the R's are methyl.

6. A method of treating arthritis which comprises orally or parenterally administering to an animal in need of such treatment, in an amount sufficient to produce anti-arthritic activity, a compound having the formula:

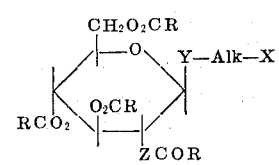

wherein:
  X is bromo, chloro, carbalkoxy of from two to five carbons, acyloxy of from two to five carbons, acylamido of from two to five carbons, acylmercapto of from two to five carbons, or benzoyloxy;
  Y is sulfur or oxygen;
  Z is —NH— or oxygen;
  R's are one of phenyl or alkyl of from one to five carbons; and
  Alk is straight or branched chain alkyl of from two to five carbons, which may be substituted by acylamido of from two to five carbons.

7. The method of treating arthritis which comprises orally or parenterally administering to an animal in need of such treatment a daily dosage regimen of from about 0.05 g. to about 12 g. of a compound having the formula according to claim 10.

8. The method of treating arthritis which comprises orally or parenterally administering to an animal in need of such treatment a daily dosage regimen of from about 0.05 g. to about 12 g. of a compound having the formula according to claim 10, wherein X is bromo, chloro, acylamido of from two to five carbons or —

$CO_2R$, Y is sulfur, Z is —NH—, R is phenyl or alkyl of from one to five carbons, and Alk is

further wherein the $R_1$ and $R_2$ are hydrogen, alkyl of from one to five carbons, or acylamido of from two to five carbons.

9. The method of treating arthritis which comprises orally or parenterally administering to an animal in need of such treatment a daily dosage regimen of from about 0.05 g. to about 12 g. of a compound having the formula according to claim 10, wherein X is bromo or chloro, Y is sulfur, Z is oxygen, the R's are methyl, and Alk is —$CH_2$—$CH_2$—.

10. The method of treating arthritis which comprises orally or parenterally administering to an animal in need of such treatment a daily dosage regimen of from about 0.05 g. to about 12 g. of a compound having the formula according to claim 10, wherein X is

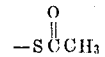

Y is sulfur, Z is oxygen, and R's are methyl.

11. The method of treating arthritis which comprises orally or parenterally administering to an animal in need of such treatment a daily dosage regimen of from about 0.05 g. to about 12 g. of a compound having the formula according to claim 10, wherein X is

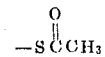

Y and Z are oxygen, and the R's are methyl.

* * * * *